July 9, 1957 E. J. BALASH 2,798,955

U. H. F.-V. H. F. COMBINATION TUNER

Filed June 14, 1954 3 Sheets-Sheet 1

INVENTOR
Edward J. Balash.
BY
F. E. Browder
ATTORNEY

July 9, 1957 E. J. BALASH 2,798,955

U. H. F.-V. H. F. COMBINATION TUNER

Filed June 14, 1954 3 Sheets-Sheet 2

WITNESSES
Robert C. Baird
J. J. Callahan

INVENTOR
Edward J. Balash.
BY
F. E. Browder
ATTORNEY

July 9, 1957 E. J. BALASH 2,798,955

U. H. F.-V. H. F. COMBINATION TUNER

Filed June 14, 1954 3 Sheets-Sheet 3

United States Patent Office 2,798,955

Patented July 9, 1957

2,798,955

U. H. F.-V. H. F. COMBINATION TUNER

Edward J. Balash, Metuchen, N. J., assignor to Westinghouse Electric Corporation, East Pittsburgh, Pa., a corporation of Pennsylvania Application June 14, 1954, Serial No. 436,279

7 Claims. (Cl. 250—40)

This invention relates to tuners for television receivers, and has an object to combine a very high-frequency (V. H. F.) tuner and an ultra-high-frequency (U. H. F.) tuner in a single compact unit.

In conventional television receivers having V. H. F. and U. H. F. tuners, the two tuners are usually physically separated, requiring considerably more space than is required for a single tuner. Also, there are inefficiencies resulting from losses in the relatively long connections between the tuners.

This invention combines a V. H. F. tuner and a U. H. F. tuner in a single unit which requires substantially no more space than is required for a conventional V. H. F. tuner. In one embodiment of this invention, the V. H. F. channel selector is a switch type selector having built around it a turret type U. H. F. channel selector. The rotary turret of the U. H. F. channel selector has contact strips thereon which have contacts which are adapted to touch fixed brushes on a brush plate, which brushes are electrically connected to the tubes and other components common to the two tuners. One of the contact strips of the turret has contacts which are connected to the V. H. F. channel selector so that that strip serves to connect to the tubes and other components when that strip has its contacts touching the brushes on the brush plate.

In operation, when it is desired to select a V. H. F. channel, the turret is rotated until the V. H. F. outlet strip has its contacts touching the brushes of the brush plate. Then the turret tuner is held against rotation while the switches of the V. H. F. channel selector are rotated to select the desired V. H. F. channel. When it is desired to select a U. H. F. channel, the V. H. F. switches are held against rotation while the turret is rotated until the contacts of the U. H. F. strip for the desired U. H. F. channel are in contact with the brushes on the brush plate.

Not only is a U. H. F.-V. H. F. combination tuner provided which occupies much less space than equivalent conventional tuners, but the efficiencies of the tuners are increased as a result of the shorter electrical connections which can be used.

Another object of this invention is to increase the efficiencies of combination U. H. F.-V. H. F. television tuners.

Another object of this invention is to provide a combination U. H. F.-V. H. F. television tuner in which one of the tuners has a turret type channel selector, and the other tuner has a switch type channel selector within the rotary turret of the other tuner.

Another object of this invention is to provide a combined U. H. F.-V. H. F. television tuner which occupies substantially no more space than a conventional turret type tuner.

This invention will now be described with reference to the annexed drawings, of which:

Fig. 1 is a side elevation, in section, of a combination V. H. F.-U. H. F. television tuner embodying this invention;

Figure 1:
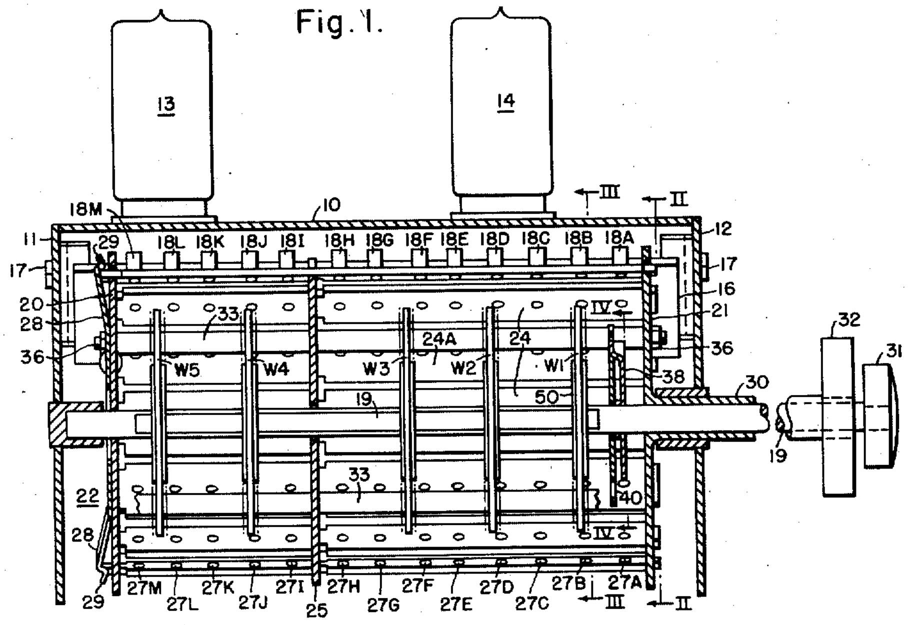
Figure 2:
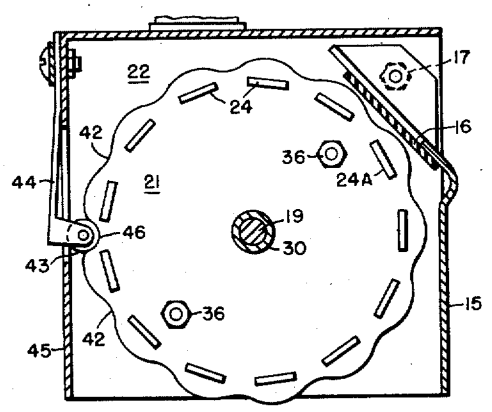
Fig. 2 is a sectional view along the lines II—II of Fig. 1.
Figure 3:
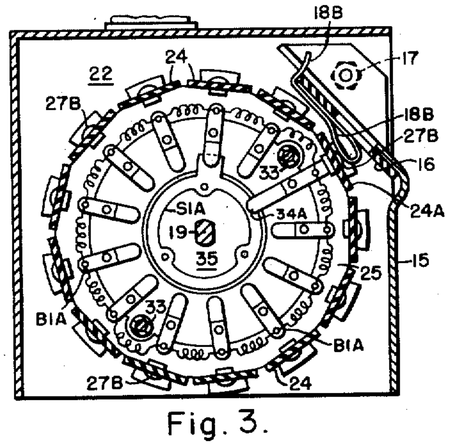
Fig. 3 is a sectional view along the lines III—III of Fig. 1.
Figure 4:
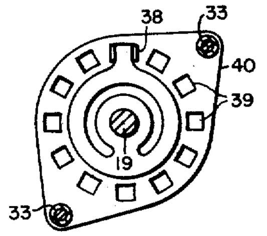
Fig. 4 is a sectional view along the lines IV—IV of Fig. 1.
Figure 5:
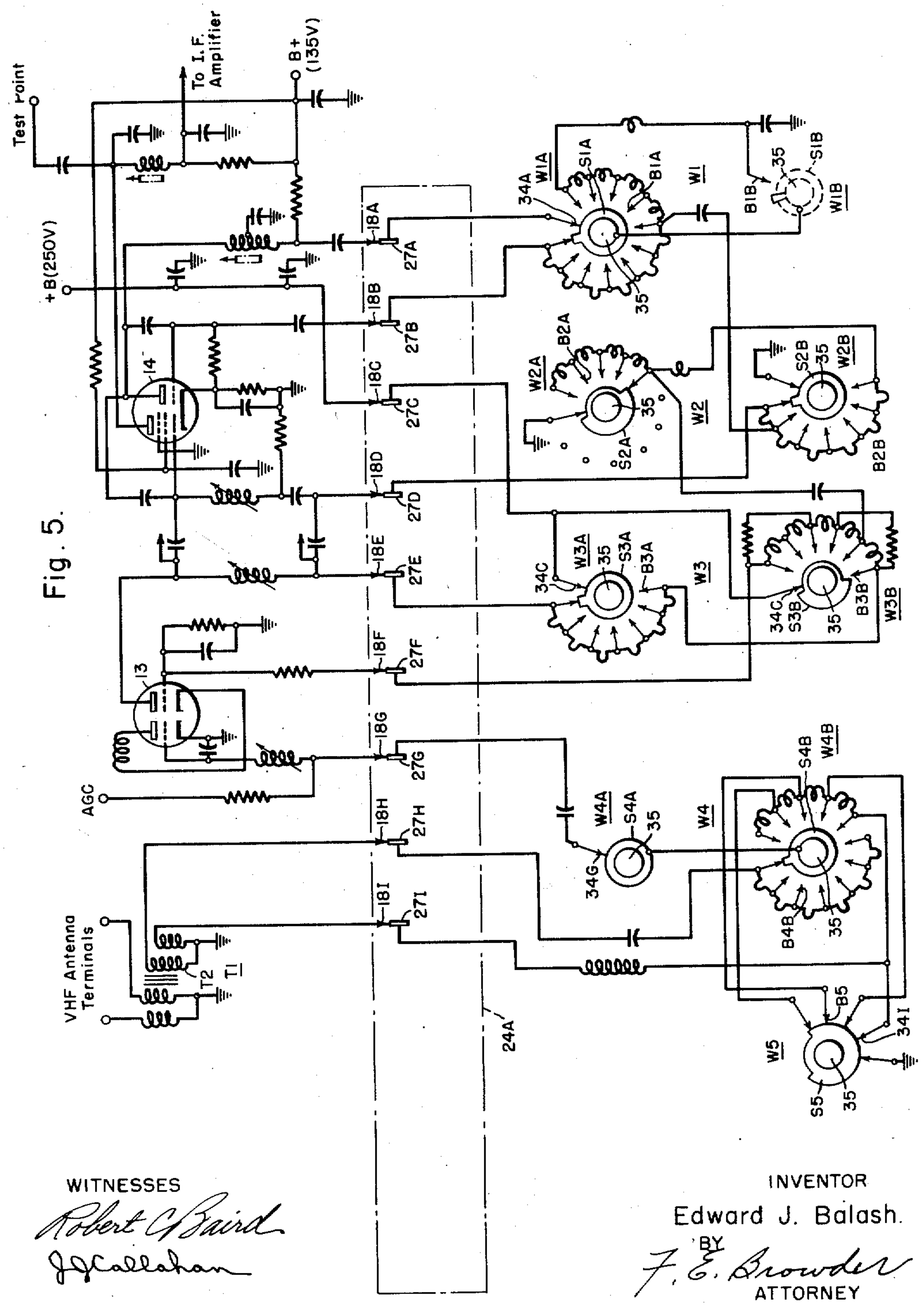
Figure 6:
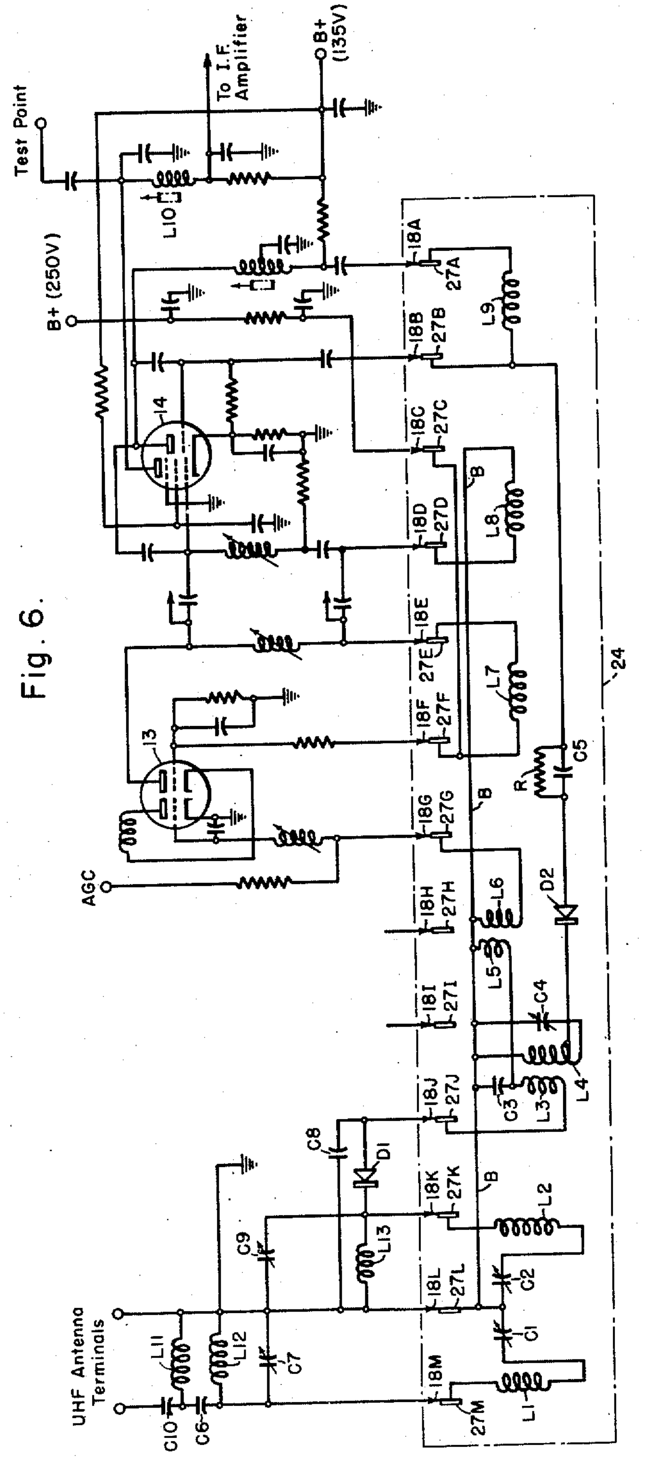

Fig. 5 is a circuit schematic showing the circuit connections of the combination tuner when tuning to V. H. F. channel; and Fig. 6 is a circuit schematic showing the circuit connections of the combination tuner when tuning to U. H. F. channels.

Referring first to Figs. 1–4 of the drawings, the combination V. H. F-U. H. F. tuner there illustrated, comprises a chassis pan 10 having the removable end plates 11 and 12, and having the sockets for the radio frequency amplifiers tube 13 and for the oscillator-mixer tube 14, located in its top. One side 15 of the pan has its upper portion turned inwardly to support the brush plate 16 of electrical insulating material, and has upwardly turned portions to which the end plates 11 and 12 are attached by the screws 17.

The brush plate 16 has the brushes 18A, 18B, 18C, 18D, 18E, 18F, 18G, 18H, 18I, 18J, 18K, 18L and 18M attached thereto.

The end plates 11 and 12 have aligned circular openings through which extends the shaft 19. The parallel end plates 20 and 21 of the rotating turret 22 have circumferentially spaced slots through which extend the ends of the twelve contact strips 24 of electrical insulating material, and the ends of one contact strip 24A of electrical insulating material. The ends of the contact strips 24 and 24A have reduced widths at their ends where they extend through the circumferentially spaced slots. The inner plate 25 of the turret 22 extends parallel to the end plates 20 and 21, and has circumferentially spaced outer portions which extend through slots in the contact strips 24 and 24A. The end plate 20 has the member 28 of spring metal attached thereto and which has the radially extending arms 29 which contact the ends of the contact strips adjacent the plate 20 for maintaining them in position. The cylindrical sleeve 30 surrounds the shaft 19 and extends through the circular opening in the end plate. The rear end of the sleeve 30 is attached to the end plate 21 of the turret 22. The shaft 19 has the tuning knob 31 attached to its front end. The sleeve 30 has the tuning knob 32 attached to its front end directly behind the knob 31.

The contact strips 24 have the metal contacts 27A, 27B, 27C, 27D, 27E, 27F, 27G, 27H, 27I, 27J, 27K, 27L and 27M (Fig. 6) extending therethrough and which are adapted to contact the brushes 18A—18M respectively.

The contact strip 24A has the metal contacts 27A—27I (Fig. 5) extending therethrough and which are adapted to contact the brushes 18A—18I respectively.

The contact strips 24 are for U. H. F. channels, and having the circuit components and connections shown by Fig. 6 on their inner sides, and which may be "printed circuits."

The contact strip 24A is the outlet strip for the V. H. F. station selector, and its contacts are connected to the V. H. F. circuit components as illustrated by Fig. 5.

The V. H. F. channel selector comprises the five switch wafers W1, W2, W3, W4 and W5, which are spaced apart and secured by the spacers 33 on the rods which have threaded outer ends with the nuts 36 thereon. The wafer W1 has front and back sides W1A and W1B, respectively. The wafer W2 has front and back sides W2A and W2B, respectively. The wafer W3 has front and back sides W3A and W3B, respectively. The wafer W4 has front and back sides W4A and W4B, respectively.

The shaft 19 which extends through the centers of the wafers has flattened sides where it extends through the wafers and is keyed by its flattened sides to the circular members 35 of electrical insulation through which it extends and which have central openings with flattened sides which contact the flattened sides of the shaft. The members 35 are fitted in circular openings in the wafers and, as shown by Fig. 5, have attached thereto the switch segments S1A, S1B, S2A, S2B, S3A, S3B, S4A, S4B and S5, the latter having the associated brushes B1A, B1B, B2A, B2B, B3A, B3B, B4B, and B5, respectively, attached to the wafers.

The construction, described so far, of the switch wafers, their switch segments and the brushes for such segments, is conventional and essentially that shown in detail by Patent No. 2,497,747.

The brushes 34A, 34C, 34G and 34I are attached to the contacts 27A, 27C, 27G and 27I, respectively, of the contact strip 24A for the V. H. F. tuner, and are adapted to touch the switch segments S1A, S3A, S4A and S5, respectively. The coils of W1A are connected to the contact 27B of the strip 24A. The coils of W2B are connected to the contact 27D of the strip 24A. The coils of W3A are connected to the contact 27E of the strip 24A. The coils of W3B are connected to the contact 27F of the strip 24A. One set of the coils of W4B is connected to the contact 27H of the strip 24A, and the other set of the coils of W4B is connected to the contact 27I of the strip 24A.

The secondary winding T2 of the V. H. F. antenna transformer T1 is connected to the brushes 18I and 18H. The grid circuit of the R. F. amplifier tube 13 is connected to the brushes 18G and 18F. The plate circuit of the R. F. amplifier tube 13 is connected to the brush 18E. The grid circuit of the mixer section of the tube 14 is connected to the brush 18D. The brush 18C is connected to B+. The brush 18B is connected to the grid circuit of the oscillator section of the tube 14, and the brush 18A is connected to the plate circuit of the oscillator section of the tube 14.

When the contact strip 24A has its contacts 27A—27I touching the brushes 18A—18I, respectively, as shown by Fig. 5, the tuner acts as a conventional V. H. F. tuner having the cascade connected R. F. amplifier tube 13 and the mixer-oscillator tube 14. The R. F. amplifier tube 13 is of the cascade type series connected for D. C. The coils on the wafer W2 and the components connected to such coils tune the mixer circuit; the coils on the wafer W1 and the components connected to such coils tune the oscillator circuit; the coils on the wafer W3 and the components connected to such coils tune the plate circuit of tube 13, and the coils on the wafer W4 and the components connected to such coils and to the switch segment S5 tune the grid circuit of tube 13 and the antenna input circuit.

Since the circuit of Fig. 5 is conventional except for the provision of the contact strip 24A and the brushes 18A—18I, it is believed that it is not necessary to describe the circuit in any greater detail than that in the foregoing.

For rotating the switch segments S1A—S5 to select the desired V. H. F. channels, the shaft 19 is turned. The shaft extends through the circular opening in the end plate 12 of the chassis pan 10, and has the tuning knob 31 attached to its front end. The turret 22 is rotated by turning the cylindrical sleeve 30 which surrounds the shaft 19. The cylindrical sleeve 30 has the tuning knob 32 attached to its front end immediately behind the tuning knob 31.

The shaft 19 has a conventional detent spring 38 attached thereto, and which slips into one of the detent depressions 39 in the detent plate 40 when its associated channel is selected. The detent plate 40 is attached to the rods of the turret 22 and has a circular opening in its center through which the shaft 19 extends. This detent assembly performs its usual function of locating the V. H. F. switch segments at the V. H. F. channel positions, and also prevents the shaft 19 and its V. H. F. switch segments from rotating while the turret 22 is being rotated to select U. H. F. channels.

The front plate 21 of the turret has an escalloped edge forming detent recesses 42 into one of which the detent roller 43, which is pressed inwardly by the spring 44, moved when its associated U. H. F. channel is selected. The spring 44 is attached at one end to the side 45 of the chassis pan 10, and has the roller rotatably attached to its other end. One of the detent recesses 46 has a substantially deeper recess than the others. When the detent roller 43 is pressed into the detent recess 46, the contact strip 24A is opposite the brush plate 16. This U. H. F. detent assembly performs its usual function of locating the U. H. F. strips 24 at the U. H. F. channel positions, and the detent recess 46 prevents the turret 22 from rotating while the shaft 19 is being rotated to select desired V. H. F. channels.

As shown by Fig. 6 of the drawings, a typical U. H. F. strip 24 has mounted on its under side circuit components which include the series connected inductor L1 and capacitor C1 connected to the contacts 27M and 27L, and comprising a first preselector circuit. The circuit components also include the series connected inductor L2 and capacitor C2 connected to the contacts 27L and 27K, and comprising a second preselector circuit. The circuit components also include the inductor L3, one end of which is connected to the contact 27J, and the other end of which is connected through the capacitor C3 to the bus B which is connected to the contact 27L. The inductor L4 which is inductively coupled to the inductor L3 is connected at one end to the bus B, and is connected at its other end through the capacitor C4 to the bus B. The inductor L5 is connected at one end to the bus B, and its other end is connected to the junction point of the inductor L3 and capacitor C3. The inductor L6, which is inductively coupled to the inductor L5, is connected at one end to the bus B and at its other end to the contact 27G. The inductor L7 is connected to the contacts 27F and 27E. The inductor L8 is connected at one end to the contact 27D and at its other end to the bus B. The inductor L9 is connected to the contacts 27A and 27B. The contact 27B is connected through the capacitors C5, which is shunted by the resistor R, to the crystal harmonic generator D2, which is connected to a tap on the inductor L4. +B potential is applied to the plate circuit of R. F. tube 13 through the brush 18C and contact 27C and the contact 27F and brush 18F.

The contacts 27H and 27I on the strip 24 are inactive and could be omitted.

In the U. H. F. antenna input circuit, the capacitors C10 and C6 are connected in series with one of the U. H. F. antenna terminals and the brush 18M. The other U. H. F. antenna terminal is connected to the brush 18L and to ground. The inductors L11 and L12 are connected to the opposite sides of the capacitor C6 and to ground. The variable capacitor C7 is connected to opposite sides of the inductor L12. The inductor L13 is connected to the brushes 18L and 18K. The crystal diode D1 is connected to the brushes 18K and 18J. The capacitor C8 is connected to the brushes 18J and 18L. The capacitor C9 is connected to opposite sides of the inductor L13.

When the brushes 18A, 18B, 18C, 18D, 18E, 18F, 18G, 18J, 18K, 18L, and 18M are in contact with the contacts 27A, 27B, 27D, 27E, 27C, 27F, 27G, 27J, 27K, 27L, and 27M, respectively, the inductor L9 serves to tune the oscillator section of the tube 14.

The U. H. F. antenna input circuit is connected through the brushes 18M and 18L, and the corresponding contacts 27M and 27L to the preselector circuits, the second of which is connected through the contact 27K and the corresponding brush 18K to the mixer diode D1 which is connected through the brush 18J and the corresponding contact 27J to the inductor L3.

The local oscillator generates a signal, the frequency of which is determined by the inductor L9. The crystal harmonic generator D2 produces an alternating current having strong harmonics which enriches the signal generated by the local oscillator. The harmonic selector circuit L4—C4 is tuned to the desired harmonic. This harmonic signal is coupled by means of the inductor L3 to the mixer diode D1 where it beats with the incoming U. H. F. signal supplied through the described preselector circuits. The resultant I. F. signal is supplied through the inductors L5 and L6, the contact 27G and the brush 18G to the control grid circuit of the R. F. amplifier tube 13. The inductor L7 is connected through the contacts 27F and 27E, and the brushes 18F and 18E to the plate circuit of the R. F. amplifier tube 13. The amplified I. F. signal is supplied to the mixer section of the mixer-oscillator tube 14 from which it is coupled to the following I. F. amplifier of the associated television receiver by means of the inductor L10. The inductors L6, L7, L8 and L10 are all tuned to the same I. F. signal. The R. F. amplifier tube 13 and the mixer section of the mixer oscillator tube 14 act as additional I. F. amplifiers when the contact strip 24 for the desired U. H. F. channel is moved opposite the brush plate 16. Thus, the insertion loss of the additional U. H. F. circuitry is compensated for by the additional I. F. gain at U. H. F., and the relative gain of the V. H. F. and U. H. F. tuners can be made equal.

*Summary of operation*

When it is desired to tune to a U. H. F. channel, the tuning knob 32 is rotated which causes rotation of the turret 22 for causing the contact strip 24 for the desired U. H. F. channel to be moved opposite the brush plate 16, with its contacts in contact with the brushes of the brush plate.

Then when it is desired to tune to a V. H. F. channel, the tuning knob 32 is rotated until the contact strip 24A is opposite the brush plate 16, with its contacts in contact with the brushes of the brush plate. The tuning knob 31 is then rotated to move the switch segments of the switch wafers to select the desired V. H. F channel.

Other methods could, of course, be use to rotate the V. H. F. and U. H. F. channel selectors separately and to permit one to rotate while holding the others against rotation.

While I have shown my invention in preferred form, it will be obvious to those skilled in the art that it is not so limited but is susceptible of various changes and modifications without departing from the spirit thereof.

I claim as my invention:

1. A television channel selector comprising a rotary turret having a plurality of contact strips thereon, contacts on said strips, brushes for contacting said contacts, a tuner for a selected band of channels within said turret, connections connecting said tuner with the contacts on one of said strips, circuit components for selection of a different band of channels on the others of said strips and connected to the contacts thereon, means for rotating said turret for causing said contacts on said other strips to contact said brushes for selecting channels of said different band and for rotating said turret for causing the contacts of said one strip to contact said brushes, and means for then tuning said tuner for selecting channels of said first mentioned band.

2. A television channel selector comprising a rotary turret having a plurality of contact strips thereon, contacts on said strips, brushes for contacting said contacts, a tuner for a selected band of channels within said turret, connections connecting said tuner with the contacts of one of said strips, circuit components for selection of a different band of channels on the others of said strips and connected to the contacts thereon, said tuner having a rotary channel selector, means for rotating said turret for causing said contacts on said other strips to contact said brushes for selecting channels of said different band and for causing said contacts on said one strip to contact said brushes, and means for then rotating said channel selector of said tuner for selecting channels of said first-mentioned band.

3. A television tuner comprising a rotary turret having a plurality of contact strips thereon, contacts on said strips, brushes for contacting said contacts, a switch type channel selector within said turret, said switch type selector comprising rotary switches and circuit components for connection to said switches, and connections connecting said switches and components to the contacts on one of said strips.

4. A television tuner comprising a rotary turret with a plurality of contact strips thereon, contacts on said strips, brushes for contacting said contacts, a switch type channel selector within said turret, said switch type selector comprising rotary switches and circuit components for connection to said switches, connections connecting said switches and components to the contacts on one of said strips, circuit components on the others of said strips and connected to the contacts thereon, means for rotating said turret for causing said contacts on said other strips to contact said brushes and for rotating said turret to cause the contacts on said one strip to contact said brushes, and means for rotating said switches.

5. A combined U. H. F.-V. H. F. television tuner comprising a rotary turret having a plurality of contact strips thereon, contacts on the outer sides of said strips, brushes for contacting said contacts, a V. H. F. channel selector within said turret, said channel selector comprising rotary switches and circuit components for connection to said switches, connections connecting said switches and components to the contacts of one of said strips, U. H. F. circuit components on the inner sides of the others of said strips and connected to the contacts thereof, means for rotating said turret for causing the contacts on said other strips to contact said brushes and for rotating said turret for causing the contacts on said one strip to contact said brushes, and means for rotating said switches when said contacts on said one strip are in contact with said brushes.

6. A combined U. H. F.-V. H. F. television tuner comprising a chassis having circuit components thereon common to V. H. F. and U H. F. channels, brushes connected to said components, a turret rotatably attached to said chassis, said turret having a plurality of contact strips thereon, contacts on the outer sides of said strips for connecting said brushes, a V. H. F. channel selector within said turret, said channel selector comprising rotary switches and circuit components for connection to said switches, connections connecting said switches and last-mentioned components to said contacts on one of said strips, U. H. F. circuit components on the inner sides of the others of said strips and connected to the contacts thereon, means for rotating said turret for causing the contacts on said other strips to contact said brushes for selecting U. H. F. channels and for causing said contacts on said one strip to contact said brushes, and means for rotating said switches to select V. H. F. channels while said one strip has its contacts in contact with said brushes.

7. A television tuner as claimed in claim 11 in which a spring element attached to said chassis is adapted to cooperate with a recess in an end plate of said turret to restrain rotation of said turret while said switches are being rotated to select V. H. F. channels, and a spring element and a detent plate associated with said V. H. F. channel selector are adapted to restrain rotation of said switches while said turret is being rotated to select U. H. F. channels.

References Cited in the file of this patent

UNITED STATES PATENTS

| | | |
|---|---|---|
| 2,545,681 | Zepp et al. | May 1, 1951 |
| 2,665,377 | Krepps | Jan. 5, 1954 |

UNITED STATES PATENT OFFICE

CERTIFICATE OF CORRECTION

Patent No. 2,798,955

July 9, 1957

Edward J. Balash

It is hereby certified that error appears in the printed specification of the above numbered patent requiring correction and that the said Letters Patent should read as corrected below.

Column 6, line 61, for the claim reference numeral "11" read -- 6 --.

Signed and sealed this 8th day of October 1957.

(SEAL)

Attest:

KARL H. AXLINE

Attesting Officer

ROBERT C. WATSON

Commissioner of Patents